United States Patent Office 3,537,990
Patented Nov. 3, 1970

3,537,990
METHOD FOR THE REMOVAL OF SUSPENDED MATTER IN WASTE WATER TREATMENT
John C. Eck, Convent, and William C. Zegel, Mendham, N.J., assignors to Allied Chemical Corporation, New York, N.Y., a corporation of New York
No Drawing. Filed May 8, 1968, Ser. No. 727,685
Int. Cl. C02b 1/20
U.S. Cl. 210—54       8 Claims

ABSTRACT OF THE DISCLOSURE

A cationic, anionic or nonionic wax dispersion is effective at flocculating suspended organic or inorganic matter in water whereby said suspended matter is readily separated from the water.

These wax dispersions are formed by the emulsification of a natural or synthetic wax using a cationic, anionic or nonionic organic emulsifying agent.

FIELD OF THE INVENTION

This invention relates to a process for the purification and clarification of water. More particularly, this invention relates to a process for removing contaminating insoluble suspended matter from water by flocculation. Still more particularly, it relates to the use of a cationic, anionic or nonionic wax dispersion to flocculate and produce settling of finely divided organic and inorganic solids suspended in water in preparation for the use or reuse of said water or its discharge to receiving surface waters.

DESCRIPTION OF THE PRIOR ART

Water used in such industrial operations as paper-making, petroleum refining, secondary recovery of petroleum by water flooding, hydroelectric plants, atomic energy operations, metal plating, boiler plants, and the like, must be relatively free of suspended matter. Clarification of naturally occurring water is necessary prior to its use in operations of this type in many instances. Additionally, one of the most difficult industrial problems is the clarification, prior to discharge of industrial waste water containing suspended matter which would otherwise create a nuisance and cause pollution of lakes and streams. Examples of such waste waters are sulfate mine waters, coal washing waters, paper or pulp waste waters, clay slimes resulting from the benefication of uranium, potash, aluminum, and other ores by hydrometallurgical processes, calcium carbonate suspensions and other suspensions of finely divided solids in water which result from industrial processes such as mining, washing, and the like. Such suspensions will frequently remain stable for many day. Likewise, in the treatment of industrial process water prior to reuse, it is frequently necessary that suspended particles be removed.

The expeditious and effective removal of suspended organic and inorganic material from water thus forms an essential step in many plant operations. New and improved processes for used water renovation and upgrading natural water, particularly for the removal of insoluble suspended matter from water, are, therefore, needed.

Various methods are currently used for the removal of insoluble contaminants from water, and in these methods flocculation procedures are rather extensixely employed. As used herein, the terms flocculating agent, coagulating agent, flocculant and coagulant are synonymous—likewise, the terms flocculation and coagulation.

Flocculation procedures in general depend upon the use of compounds known as coagulants or flocculants to remove suspended matter from contaminated water by the formation of a floc comprising the flocculant and the suspended matter. The water containing the floc may then be passed through flocculator units to enlarge the floc and then into settling basins where most of the flocculated suspended matter can be separated from the water by decantation or filtration.

The desired goal in a flocculation procedure is to obtain the maximum degree of removal of suspended matter with the minimum expenditure of money for flocculants and treatment facilities. It is, therefore, desirable that the flocculant be effective for the removal of the suspended matter with the use of a minimum amount thereof. It is also desirable that the floc settle relatively rapidly and that the floc be relatively tough in order that it will not break up or disintegrate while the water containing it is being conveyed to a settling basin, filter bed, or other separation means.

Alum and iron salts are currently used extensively in clarifying raw and waste water supplies of many types, particularly in municipal water clarification and in the clarification of water supplies used in industrial processes. Quite frequently, it is necessary to use extremely large dosages of alum or iron salts to clarify such waters.

Series investigators of the mechanism by which alum coagulates suspended matter in water have determined that the alum functions in a dual role insofar as it must first neutralize the charges associated with the surface of the suspended particles, which charges tend to keep these particles in suspension. Once the particle charges have been neutralized, which point is generally called the isoelectric point, it has been postulated that additional amounts of alum are necessary to provide a voluminous, sticky surface on which to absorb the neutralized particles and produce a floc with sufficient density to settle rapidly. Thus, in some cases, it is necessary to use as much a 500 p.p.m. of alum to effectively coagulate a turbid water, with the larger part of the alum acting in the function of a binder or a coalescer for the neutralized particles. When such large quantities of alum are used to coagulate the suspended matter in such waters, undesirable decreased in pH's sometimes occur, and the cost of treatment becomes excessive.

The need for flocculating agents which would not cause this pH decrease has long been realized. Natural organic substances such as animal glues, natural vegetable gums and modified gums have been employed with moderate success. The limited pH range in which such agents may be effectively used, the criticality of the amounts that must be added to the suspensions, the difficulties encountered due to spoilage during storage, and the accompanying variations from specifications are definite disadvantages to their use and prevent their wide acceptance.

Within recent years, numerous journal articles and patents have appeared containing teachings to the effect that suspensions of organic and inorganic solids can be flocculated and settled to effect clarification thereof through the use of appropriate synthetic organic polymer resins. In general, water-soluble polymers of various types such as polyacrylamide, polymethacrylic acid and polyvinyl pyrrolidone have been used. While good results have been achieved in a few instances, polymer promoted flocculation processes, as presently practiced, usually require large, precisely metered doses of polymer and are, therefore, uneconomical for large-scale clarification operations such as those required for most municipal and industrial waste streams.

Additional disadvantages of the current processes of chemical treatment of water containing suspended organic or inorganic matter include: (1) slowness of removal of coagulant flocs from the treated water with a consequent need for costly large size treating and settling tanks; (2) inefficiency in the removal of very finely divided suspended matter; (3) relatively low purity of the treated water; and (4) relatively high volume of sludge produced per unit volume of water treated.

Generally, both organic and inorganic suspensions comprise negatively charged particles, and the flocculants hitherto most often used are cationic in nature. However, much of the cationic coagulant may not be effective as such, since it is used up in charge neutralization and not in flocculation as such. Even in the chemical coagulation of solids in raw water supplies, wherein the suspended solids content is generally only a few parts per million, acceptable clarification has hitherto been achieved only by using relatively large and expensive treating equipment and excessively large amounts of chemical coagulant per unit amount of suspended solids removed. Additionally, some suspensions are positively charged or essentially neutral. With suspensions of this latter type, the cationic flocculating agents hitherto generally used have been of very limited effectiveness.

It may be said, therefore, that to date no really satisfactory chemical clarifying agent or chemical process for removing suspended organic or inorganic matter from aqueous liquors at acceptable cost has been developed. It would, thus, be desirable to provide an efficient flocculation process whereby more complete and rapid separation of disperse organic and inorganic solids from aqueous media is achieved with an organic polymeric flocculant.

SUMMARY OF THE INVENTION

It is an object of the invention to provide an economical process for removing from raw water used for municipal or industrial purposes and from industrial process and waste water a portion of the suspended and settleable solids contained therein.

It is a further object of this invention to provide a novel type of clarifying agent for the treatment of such water, which type of clarifying agent causes rapid flocculation and sedimentation of the suspended solids therein and thereby makes said solids adapted for easy and rapid removal at low cost, in treating mechanisms of simple design and modest size.

Another object of the present invention is to provide a new and improved method for coagulating and producing settling of finely divided, predominantly inorganic solids from relatively dilute suspensions thereof in water.

Another object of the invention is to provide a process for treating inorganic aqueous suspensions in which a relatively small amount of added substance will produce a uniform floc and settling of the finely divided suspended solids without introducing into the water substances which have a harmful effect on industrial processes or cause harmful pollution of streams.

Another object is to provide a sewage sludge of relatively higher solids content, and of relatively lower volume per unit volume of sewage treated, than is obtained in present conventionally used chemical methods of treating sewage.

Another object is to provide a sludge of modified characteristics, e.g., dewatering, filtration, dispersion and digestion characteristics, as compared to the sludge obtained with conventional chemical methods of treating sewage or such like liquors.

Further objects and advantages will become apparent from the description of the invention which follows in greater detail.

These and other objects are accomplished in accordance with this invention wherein water containing suspended matter is treated with a cationic, anionic or nonionic wax dispersion flocculating agent. The wax dispersions of this invention are found to promote the flocculation of the suspended matter in water whereby it is readily separated from the water by conventional means.

Our copending applications, Ser. No. 646,188 filed June 15, 1967, and Ser. No. 671,119 filed Sept. 27, 1967, now U.S. Pat. No. 3,485,752, disclose the use of synthetic organic cationic, anionic and nonionic lattices as flocculating agents for suspended organic and inorganic matter in water. It has now been found in accordance with the instant invention that cationic, anionic and nonionic wax dispersions are also effective flocculating agents in the treatment of aqueous suspensions.

Various advantages accrue from the use of an anionic, cationic or nonionic wax dispersion as a flocculant in the clarification of water. One of the foremost advantages is the production of a floc which settles faster. This advantage is particularly important since it makes it possible either to increase the amount of contaminated water undergoing treatment or to treat a given quantity of water in a shorter period of time when a wax dispersion coagulant is used as herein described, and, thus, the economy of the clarification operation is greatly improved. Also, the use of the wax dispersion coagulant results in the production of a tougher, relatively difficultly disintegrated floc. This advantage is of importance when the water containing the floc is conveyed to a filter or other separation means. The floc tends to remain in an integrated form, and as such it is readily separated from the water. Also, it is possible to employ a lesser amount of the wax dispersion coagulant than of an inorganic coagulant to effect the equivalent degree of clarification of the water. This advantage makes use of the wax dispersion economically desirable. It is also obvious that by the use of an organic, rather than an inorganic coagulant, the content of dissolved solids and the conductivity of the treated water are reduced, making the water of better quality for numerous commercial uses. With some waters, use of the wax dispersion improves the taste of the treated water, reducing or eliminating its astringent quality.

The decision as to whether to use a nonionic, anionic or cationic wax dispersion to flocculate the suspended matter in the water being treated depends upon the nature and concentration of the suspended matter. With predominantly inorganic suspensions, the most effective wax dispersion is usually cationic. With a predominantly organic suspension, unless it is extremely diffuse, a cationic wax dispersion is normally less efficient than an anionic one in that too much of it must be utilized solely to effect charge neutralization. A much lower concentration of an anionic wax dispersion will remove a considerable portion of the suspended organic matter. If a greater degree of purification is desired, some of the suspended organic matter may first be precipitated by an anionic wax dispersion and a further final clarification of the treated water then effectuated with a cationic wax dispersion.

As has heretofore been indicated, most suspensions being at least partly colloidal in nature are negatively charged. However, many suspensions are electrostatically neutral or positively charged. We have found that the nonionic wax dispersions are generally superior flocculants for such neutral or positively charged suspensions. However, the nonionic dispersions will also flocculate negatively charged suspensions, although an ionic dispersion is generally more effective.

The determination of the preferred chemical type of wax dispersion flocculant, i.e., cationic, anioinc or nonionic, for any particular suspension is best done empirically. One means of doing this is to place three samples of the aqueous suspension to be treated in individual beakers and agitate the samples at a uniform rate while adding to the three agitated samples an equivalent dosage of an anionic, a cationic and a nonionic wax dispersion, respectively. After addition of the wax dispersion is complete, the treated suspensions are allowed to stand either quiescent or with very mild agitation for a given period. The turbidity of each of the treated samples is then determined. The type of wax dispersion affording the lowest turbidity is the type preferred for treating the particular suspension. The particularly preferred wax dispersion within a given chemical type for treating a given suspension may likewise be determined by similar comparative tests.

The aqueous suspensions of organic, inorganic, or mixed organic/inorganic solids suitable for processing in accordance with the invention can vary in solids content over a wide range. Water containing up to 20,000 or more parts per million of suspended matter may suitably be treated according to this invention.

The optimum dosage of wax dispersion coagulant for any particular aqueous suspension to be treated is distinctly an individual problem and can be best determined—even as the particularly preferred wax dispersion—by actual comparative tests (see Babbitt and Baumann, "Sewerage and Sewage Treatment," 8th edition, John Wiley and Sons, Inc., New York, 1958, p. 449; and "Water Works and Sewerage," 81, 358 (1938)). However, we have generally found that suitable treating levels for the wax dispersions of the type herein described lie in the range of from about 0.1 to about 50 parts of wax per million parts of aqueous liquid to be treated and quite generally in the range below about 10 parts of wax per million parts of aqueous liquor to be treated when the suspended matter is substantially organic. For substantially inorganic suspensions, the preferred treating level is from about 5 to about 50 parts of wax per 1000 parts of suspended matter.

For exceptionally high concentrations of suspended matter, either organic or inorganic, a greater dosage of wax of up to 1000 p.p.m. may suitably be used. The wax concentration in the dispersion generally ranges from 10% to 40% by weight. Therefore, sufficient dispersion is added to provide the heretofore indicated treat levels of wax.

It will be appreciated by those skilled in the art that the ranges discussed in the above paragraphs are determined largely by economic practicability and that some degree of reaction can be obtained over a wide range of conditions including conditions outside the above-described limits.

The process of the present invention may be successfully used concomitantly with various standard methods of industrial waste water treatment in which a digestion, settling or filtration step or combination thereof is used.

In carrying out the process of our invention, the wax dispersion flocculant is added to the aqueous suspension, preferably with agitation, whereby a uniform distribution of the wax dispersion flocculating agent throughout the suspension is accomplished quickly but without such turbulent agitation as to degrade any flocs building up immediately upon the addition of the flocculant.

Length of the period of agitation is dependent upon several variables, such as the design of the agitation equipment, the clarification desired, the coagulant employed, the amount of coagulant used, and the like. The preferred period varies from about 10 to about 60 minutes, but in some instances the desired degree of clarification can be obtained by agitating the mixture for a period of less than 10 minutes.

After the period of agitation, the wax dispersion-treated suspension is allowed to stand either quiescent or with very mild agitation for a period sufficiently long to permit concentration of the floc into a substratum. Standing for from about 2 to 30 minutes is ordinarily sufficient. The floc may then be separated from the aqueous dispersing medium by any convenient and known separatory technique. Such a technique can involve one or a combination of operations such as sedimentation, decantation, filtration, centrifugation, and flotation.

The process of this invention is particularly adaptable to the treatment of sewage. Sewage ordinarily is a dilute aqueous mixture of the wastes from households and industry that it is convenient and economical to carry away by water. As used in this specification and in the appended claims, the term sewage refers to any of the ordinary types of aqueous liquors containing significant amounts of wastes such as fecal matter, domestic wastes, industrial wastes and such like, and is not to be construed as being limited to meaning only aqueous liquors which in lay terms are ordinarily called sewages, nor should it be contrued as being limited to mean aqueous liquors which have actually been carried through pipe, conduit or sewers. The term treated sewage is intended to include the effluent from primary or secondary settling basis, trickling filters, high-rate aeration or activated sludge processes, contact aeration, sand filter, and other like sewage treatment processes.

In a preferred embodiment of this invention, as applied to sewage treatment, sewage is treated sequentially with both the anionic and cationic wax dispersion of the instant invention to thereby increase the efficiency of conventional sewage treatment processes. A conventional treatment of sewage generally entails the following stages:

(1) Primary settling of the raw sewage to effect the removal of a portion of the insoluble material present;

(2) Aerobic digestion of the primary settler effluent whereby aerobic bacteria assimilate a portion of the remaining suspended and dissolved organic matter still present and convert it into microbial cells;

(3) Clarification of the digester effluent wherein the microorganisms agglutinate to form a sludge which is removed from the treated water;

(4) Tertiary treatment wherein the dissolved solids content of the water is reduced preparatory to its reuse or discharge into suitable receiving surface water.

The effectiveness of the primary setting stage can be greatly increased by treatment of the raw sewage, after its admission to the settling tank, with an anionic wax dispersion. A substantially greater percentage of the suspended matter present precipitates out than if no anionic wax dispersion is added or than if the same amount of alum or of cationic wax dispersion is added. Treatment of the raw sewage in the primary settling stage with anionic wax dispersion also significantly increases the effectiveness of the subsequent bacterial digestion stage, since less suspended matter is present which the bacteria must assimilate.

The amount of anionic wax dispersion that is suitably employed in carrying out this invention with respect to the primary settling of raw sewage is quite variable. A concentration of wax ranging from 0.1 to 10 parts per million parts of water is normally effective. It will be understood that greater concentrations can be used if desired. However, a greater concentration is not necessary in most instances, and for purposes of economy is not preferred. A concentration within the range of 0.2 to 2.0 parts by weight per million parts by weight of water is particularly preferred.

In the post-digestion clarification stage, the natural agglutination tendency of the bacterial cells present in the digester effluent can be significantly augmented by the addition of a cationic wax dispersion. Likewise, after separation of the water from the agglutinated cells and prior to tertiary treatment, the water may profitably be treated with a caionic wax dispersion to reduce its suspended solids content still further. A suitable treating level in these stages is from about 5 to about 50 parts of wax per million parts of water.

The agglutinated bacterial cell precipitate frequently contains substantial amounts of water. It has also been found that a cationic dispersion is a useful adjunct in the dewatering of this bacterial sludge so as to reduce the quantity of material which must be discarded.

Where the suspended matter to be coagulated is predominantly inorganic and negatively charged, a cationic wax dispersion is preferably employed. Normally, from about 20 to about 50 p.p.m. of wax per 1000 p.p.m. of suspended inorganic solids will suffice for the substantially complete coagulation and precipitation thereof.

In order to be satisfactory for use in conventional industrial waste water clarification equipment, the floc produced from water containing suspended matter by treatment with a coagulant should have the ability to settle from the water in a period of time of 5 minutes or less under conditions of normal jar testing using 1000-ml. samples of aqueous suspension in 1.5-liter breakers. Flocs which take longer than this to settle are not considered suitable from the standpoint of effectively utilizing conventional clarification equipment. While the period of time indicated above is considered as being standard for most of the water treatment industry, the flocs produced in accordance with the instant invention, however, are generally capable of settling in periods of time ranging from 30 seconds to about 3 minutes, based on jar test observations. The flocs produced in accordance with this invention are also less fragile, hence, they are less subject to breaking or flanking than is the case when prior art coagulants such as alum are used.

The terms cationic, anionic wax dispersion, as used herein, contemplate a water-based system, i.e., a two-phase system, wherein a particulate solid wax is the internal, discontinuous phase dispersed in the aqueous, external, continuous phase. Such dispersions are frequently categorized as emulsions to which they are closely analagous, however, the term emulsion should properly be limited to systems where both the internal and the continuous phases are liquid. The term cationic, anionic or nonionic connotes that the hydrophobic portion of the dispersing, i.e., emulsifying, agent for the dispersed wax is positively charged, negatively charged, or uncharged respectively.

The wax dispersions of the instant invention are to be distinguished from the cationic, anionic and nonionic synthetic organic latices of our copending applications hitherto alluded to. Such latices are prepared by the free radical-induced emulsion polymerization of ethylenically unsaturated monomer. The polymer particles of such latices are of substantially colloidal size. Of critical significance is the fact that once coagulated such a latex cannot be reemulsified.

In contradistinction, the wax dispersions of the instant invention are prepared by dispersing a natural or synthetic wax in water using a cationic, anionic or nonionic emulsifier. To effectuate such a dispersion, a molten mixture of wax, plus emulsifier, is added to vigorously stirred water. Preferably, the molten wax plus emulsifier is added to water heated to about 95° C. In this manner, the molten wax is dispersed throughout the water as very fine globules which form a very fine, solid dispersion when cooled below the wax melting point. Waxes having a melting point ranging from about 40° C. to about 130° C. can be suitably dispersed in this manner. Alternatively, although not preferably, the molten wax can be added to an agitated water-emulsifier mixture or, where the wax has a melting point below the boiling point of water, a mixture of wax, water and emulsifier can be heated with stirring above the wax melting point.

The wax dispersions of the instant invention, unlike synthetic organic latices, can, of course, be reemulsified following coagulation using any of the above-indicated dispersing techniques.

The wax dispersions of the instant invention are readily manipulated fluids that disperse readily in the aqueous suspensions being treated. Additionally, diluted solutions of the wax dispersions are stable in long-term storage.

The term wax, as used by the skilled chemical artworker, cannotes a plastice, slippery, organic solid which is easily melted.

As used in the instant invention, the term wax connotes naturally occurring waxes or analogous synthetic materials having wax-like physical properties which are water insoluble but which may be dispersed in water with the aid of a cationic, anionic or nonionic emulsifying agent and which have a melting point ranging from about 40° C. to 130° C.

The predominant or sole constituents of naturally occurring waxes are $C_{10}$ to $C_{44}$ saturated hydrocarbons and monohydric alcohols and fatty acids which may be present in the free state or interacted to form esters. Small amounts of olefins, unsaturated alcohols and acids and hydroxy and/or ketonic alcohols and acids may also be present.

Naturally occuring waxes are substantially free of aromatic molecules and of elements other than carbon, hydrogen and oxygen. For example, beeswax consists essentially of a mixture of $C_{25}$ to $C_{31}$ fatty acids, fatty alcohols and saturated hydrocarbons.

Synthetic waxes generally consist of esters or saturated aliphatic hydrocarbons or partially oxidized aliphatic hydrocarbons having a molecular weight ranging up to about 5000. Synthetic polyethylene wax consists essentially of normal hydrocarbons having a molecular weight ranging from 1500 to 5000.

Examples of suitable waxes for preparing the dispersions of the instant invention include naturally occurring animal and vegetable waxes such as beeswax, spermacetti, carnauba, ouricury, sugar cane, raffa and candelilla, earth waxes such as ozocerite, montan, ceresin and lignite wax, oxidized petroleum waxes such as paraffin wax and microcrystalline wax, and synthetic waxes such as the glycol stearates, oxidized Fisher-Tropsch wax and oxidized polyethylene wax. If desired, a mixture of waxes can be used, but ordinarily this is not particularly advantageous. The preferred wax is an oxidized polyethylene wax having a melting point of 95° C. to 110° C.

As heretofore indicated, the dispersed wax will preferably comprise from 10% to 40% by weight of the dispersion, most preferably 25% to 40%.

Any of a wide variety of known cationic, anionic or nonionic emulsifying agents which are compatible may be used to prepare the dispersions of the instant invention. In preparing cationic or anionic dispersions, the more strongly ionic emulsifiers are preferred. The specific kind and quantity of emulsifying agent used will depend upon the nature of the wax or waxes present and upon the conditions of dispersion. From about 2 grams to about 25 grams of emulsifying agent is generally used per 100 grams of wax. If desired, a combination of emulsifying agents of the same type, i.e., a combination of cationic emulsifiers or a combination of anionic emulsifiers may be used. Likewise, in some instances, an emulsifier combination comprising a cationic or anionic emulsifier and a nonionic emulsifier may advantageously be utilized. Of course, in preparing a nonionic dispersion, any desired single or mixed nonionic emulsifier may be used.

Illustrative examples of suitable cationic emulsifying agents are the quaternary salts derived from suitable inorganic or organic acids or inorganic acid salts and nitrogen-containing compounds such as $C_{10}$ to $C_{30}$ primary fatty amines, mono- to deca-ethoxylated $C_{10}$ to $C_{30}$ primary fatty amines, secondary and tertiary alkyl amines having a total of from 10 to 30 carbon atoms and ethoxy derivatives of such secondary amines having from 1 to 15 ethoxy groups, $C_{10}$ to $C_{30}$ fatty acid amides of 2-aminoethyl imidazoline, 2–$C_{10}$ to $C_{30}$ alkyl imidazolines and 1-hydroxyethyl imidazolines, trimethylated or triethylated $C_{10}$ to $C_{30}$ n-alkyl amines, dimethylated alkyl or aralkyl amines having a total of 1 to 30 carbon atoms, 1-amino- or 1-hydroxyethyl-2-glyoxaline (imidazole) of $C_{10}$ to $C_{30}$ fatty acid amides or esters thereof, and $C_{10}$ to $C_{30}$ n-alkyl pyridines.

Suitable acids for interaction with the basic nitrogen compound include hydrochloric, hydrobromic, hydroiodic, sulfuric, sulfurous, benzene and toluene, sulfonic, phosphoric, nitric, acetic, oxalic, propionic, tartaric, citric, sulfamic, glycolic, diglycolic, and ethylenediaminetetraacetic. Suitable acid salts include ammonium sulfate, sodium bisulfate, potassium bisulfate, methyl hydrogen sulfate, and sodium acid phosphate.

Particularly preferred cationic emulsifying agents include the hydrochloride or acetate quaternary salts of $C_{10}$ to $C_{20}$ alkyl imidazolines, the hydrochloride or acetate quaternary salts of 1 to 15 times ethoxylated $C_{15}$ to $C_{25}$ primary fatty amines, $C_{10}$ to $C_{20}$ n-alkyl trimethyl ammonium chlorides and the hydrochloride or acetate quaternary salts $C_{10}$ to $C_{20}$ primary fatty amines.

Suitable anionic emulsifying agents include the ammonium and alkali metal salts of $C_{10}$ to $C_{30}$ primary and secondary alkyl sulfonates and sulfates, of $C_8$ to $C_{20}$ alkyl benzene sulfonates and $C_8$ to $C_{20}$ alkyl naphthalene sulfonates, of ethoxylated $C_{10}$ to $C_{30}$ aliphatic alcohol sulfates and of sulfates of ethoxylated $C_5$ to $C_{20}$ alkyl phenols and alkali metal, ammonium and $C_1$-$C_4$ quaternary amine salts of $C_{12}$ to $C_{30}$ fatty acids.

Illustrative examples of suitable nonionic emulsifying agents are polyethoxylated $C_7$ to $C_{30}$ alkyl phenols, polyethoxylated $C_7$ to $C_{30}$ fatty acids and fatty alcohols, $C_7$ to $C_{30}$ alkylphenoxy polyethyleneoxy ethanols, polyethoxylated vegetable oils and $C_7$ to $C_{30}$ fatty acid amides of $C_2$ to $C_6$ alkanol amines. Preferred nonionic emulsifying agents are the $C_7$ to $C_{30}$ alkylphenoxy polyethyleneoxyethanols. Particularly preferred nonionic emulsifying agents include such alkylphenoxy polyethyleneoxyethanols wherein the alkyl group is $C_8$ to $C_{13}$. The nonionic emulsifier must be soluble in water to the extent of at least about 2% by weight. Increasing the length of the alkyl groups present in the emulsifier molecule tends to reduce its water solubility while increasing the number of ethoxyl groups present increases water solubility. The skilled artworker can readily select the proper degree of ethoxylation commensurate with alkyl group chain length to achieve at least the minimum requisite degree of water solubility.

The invention can be more fully understood by reference to the following examples. All parts by weight unless otherwise expressly noted.

All the dispersions of the following examples were prepared by adding a molten mixture of wax plus emulsifier, to vigorously agitated water heated to 95° C. followed by cooling to room temperature at which point agitation was terminated.

Dose levels in the following examples refer to parts by weight of wax per million parts of water containing suspended matter.

EXAMPLE 1

A 500-ml. sample of raw sewage was treated by adding 1 p.p.m. of anionic wax dispersion and agitating with a 3″ x 1″ paddle for 10 minutes in the following manner: 100 r.p.m. for 1 minute, 30 r.p.m. for 4 minutes, and 10 r.p.m. for 5 minutes. The suspended solids were then determined by taking a 50-ml. sample and filtering it using a Gooch crucible and a fiberglas media and noting the change in weight of the filter media.

The following table indicates that the treatment of raw sewage, by the addition of an anionic wax dispersion, is exceedingly effective in the removal of suspended matter from the raw sewage.

| Wax | Emulsifier | Dose (p.p.m.) | Suspended solids remaining after treatment (mg./l.) |
|---|---|---|---|
| Oxidized polyethylene 3.2% O, mol. wt. 1750 | Morpholine/oleic acid salt | 1 | 4 |
| Carnauba No. 3-NC | Do | 1 | 6 |
| Oxidized Fisher-Tropsch mol. wt. 2000 | Sipanol 2E1 [1]/oleic acid salt | 1 | 56 |
| Oxidized paraffin mol. wt. 1400 | do.[1] | 1 | 6 |
| Original water (control) | No treatment | | 100 |

[1] Diethyl amine plus 1 mol ethylene oxide.

EXAMPLE 2

A 500-ml. sample of the effluent from an activated sludge process sewage treatment plant was treated with 6 p.p.m. of cationic wax dispersion, agitated to 60 r.p.m. by a 3″ x 1″ paddle for 10 minutes and allowed to settle for 10 minutes. The transmittance of a sample to 650-micron light was then measured and compared to that for deionized water.

The following table indicates that a cationic wax dispersion is exceedingly effective in the removal of suspended matter from the effluent water from an activated sludge process sewage treatment plant.

| Wax | Emulsifier | Dose (p.p.m.) | Percent transmittance of water |
|---|---|---|---|
| Oxidized polyethylene 3.2% O, mol. wt. 1750 | Hodag C-1000-O [1]/acetic acid | 6 | 98 |
| Carnauba No. 3-NC | Sipanol 1S2 [2]/acetic acid salt | 6 | 99 |
| Oxidized polyethylene 3.2% O, mol. wt. 1750 | do | 6 | 98 |
| Original water (control) | No treatment | | 84 |

[1]
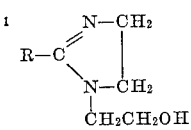

where R=oleic.

[2] Stearyl amine plus 2 mols ethylene oxide.

EXAMPLE 3

100 grams of kaolin, 150 grams $H_2SO_4$ and 50 grams $H_2O$ were heated to 120° C. with agitation for 4 hours so as to liberate $Al_2(SO_4)_3$ from the clay. The resulting suspension required an extremely long period of time to settle. The use of a nonionic wax dispersion (oxidized polyethylene wax of Example 1 and a $C_{12}$-monoalkyl phenoxypoly[ethyleneoxy]ethanol emulsifier) to the extent of only 15 p.p.m. in a 1000-mg./liter suspension of the above solids resulted in large, rapidly settling flocs.

EXAMPLE 4

One liter of aerator sludge from an activated sludge sewage treatment plant was placed in a 1-liter graduated cylinder. The desired dose of wax dispersion was added and the sample agitated by inverting the closed cylinder several times. After settling for 20 minutes, the volume of the settled material was measured and compared to that for untreated sludge.

The following table indicates the considerable sludge dewatering that occurs upon treatment of a sludge from an activated sludge sewage treatment plant with a cationic wax dispersion.

| Wax | Emulsifier | Dose (p.p.m.) | Percent reduction in sludge volume in 20 min. |
|---|---|---|---|
| Oxidized polyethylene 3.2% O, mol. wt. 1750 | Sipanol 1S2/acetic acid | 80 | 44 |
| Do | Armeen T[1]/acetic acid | 40 | 35 |

[1] Tallow amine ($R-NH_2$).

EXAMPLE 5

The use of a cationic dispersion of oxidized polyethylene wax (3.6%, molecular weight 2000) greatly enhances the settling characteristics of a waste water containing finely divided particles of polyvinyl chloride. This waste water resulted from the manufacture of polyvinyl chloride by emulsion polymerization. A 500-ml. sample of this waste water containing 1400 p.p.m. of suspended polyvinyl chloride was flocculated by the addition (using the agitation sequence of Example 1) of 10 p.p.m. of a polyethylene wax dispersion emulsified with the acetate salt of a mixture of tallow amine and oleyl imidazoline.

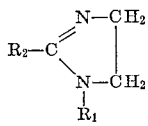

wherein $R_1=CH_2CH_2OH$ and $R_2=$oleyl, as dispersing agent.

EXAMPLE 6

In the washing of freshly mined coal, a waste water is produced which contains suspended, predominantly inorganic material that settles very slowly. The settling rate is of the order of 5 ft./hr. With the addition of 15 p.p.m. of starch, the settling rate is not appreciably affected; however, with the addition of 15 p.p.m. of starch and 15 p.p.m. of oxidized polyethylene wax of Example 4 dispersed by the acetate of the oleyl-substituted imidazoline as in Example 5, the settling rate was increased to 53 ft./hr. This settling rate is the rate at which the water containing suspended matter separates into visually distinguishable, clear upper and cloudy lower layers. For example, a settling rate of 5 ft./hr. indicates that after one hour of quiescent standing the upper five feet of a tank of such water would be clear.

EXAMPLE 7

A 500-ml. sample of water containing a suspension of styrene-divinylbenzene (with $-N-(CH_3)_3^+Cl^-$ groups on the styrene) polymer was agitated with a 3" x 1" paddle at 60 r.p.m. while 10 p.p.m. of wax dispersion was added. After stirring for 10 minutes, it was allowed to settle for 5 minutes and a sample of the water withdrawn. The transmittance of this water to 650-micron light was compared to that for deionized water.

| Wax | Emulsifier | Dose (p.p.m.) | Percent transmittance |
|---|---|---|---|
| Oxidized polyethylene 3.2% O, mil. wt. 1750 | Sipanil 2M1[1] oleic acid | 10 | 95.2 |
| Do | Sipanol 2E1/oleic acid | 10 | 96.2 |
| Original water (control) | No treatment | | 90.8 |

[1] Methyl analog of Sipanol 2E1.

Various modifications will be apparent to one skilled in the art, and it is not intended that this invention be limited to the details in the specific examples presented by way of illustration. Accordingly, the scope of the invention is limited only by the appended claims.

We claim:
1. A process for treating water containing suspended matter to remove a portion thereof comprising:
   (a) adding to an influent of said water an aqueous wax dispersion wherein said wax comprises from 10 to 40% by weight of said dispersion and wherein said wax is dispersed by means of a cationic, anionic or nonionic emulsifying agent which is present in an amount of from about 2 to about 25% by weight based on the weight of the wax,
   (b) permitting the concentration of a floc comprising said suspended matter and wax dispersion constituents into a substratum; and
   (c) separating said floc from said treated water
2. A process in accordance with claim 1 wherein said wax dispersion is distributed substantially homogeneously throughout said water containing suspended matter.
3. A process in accordance with claim 1 wherein said separation is effected by decantation.
4. A process in accordance with claim 1 wherein said separation is effected by filtration.
5. A process in accordance with claim 1 wherein said water containing suspended matter is raw sewage and wherein said wax dispersion is anionic.
6. A process in accordance with claim 1 wherein said water containing suspended matter is treated sewage and wherein said wax dispersion is cationic.
7. A process in accordance with claim 1 wherein said wax is oxidized polyethylene wax.
8. A process in accordance with claim 1 wherein said wax dispersion is nonionic.

References Cited
UNITED STATES PATENTS

| 2,240,403 | 4/1941 | Karlstrom | 210—43 |
| 2,563,897 | 8/1951 | Wilson et al. | 210—54X |
| 3,259,570 | 7/1966 | Priesing et al. | 210—54X |

MICHAEL E. ROGERS, Primary Examiner